United States Patent
Kronas et al.

[15] 3,692,267
[45] Sept. 19, 1972

[54] POSITIONAL ADJUSTMENT DEVICE FOR CASKET BEDS

[72] Inventors: Nicholas T. Kronas, Danville; Robert W. Ehrich, Georgetown, both of Ill.

[73] Assignee: Estad Products, Inc., Danville, Ill.

[22] Filed: April 15, 1971

[21] Appl. No.: 134,344

[52] U.S. Cl. .................248/288, 5/328, 27/12, 85/32
[51] Int. Cl. ..............................A47g 19/00
[58] Field of Search......248/125, 288, 404, 405, 410; 5/328; 85/32; 151/20; 27/12

[56] References Cited

UNITED STATES PATENTS

| 936,767 | 10/1909 | Van Eyck | 248/125 UX |
| 2,888,732 | 6/1959 | Nelson | 27/12 |
| 3,041,704 | 7/1962 | Gruber | 27/12 |
| 3,147,003 | 5/1920 | Johnson | 151/20 UX |

Primary Examiner—William H. Schultz
Attorney—Woodard, Weikart, Emhardt & Naughton

[57] ABSTRACT

Disclosed is a mechanism for elevating or lowering a bed within a casket comprising a vertical threaded rod or elevating screw which carries a stop member which can be adjustably positioned on the rod for adapting the mechanism for various casket heights.

3 Claims, 4 Drawing Figures

INVENTORS
NICHOLAS T. KRONAS
ROBERT W. EHRICH
BY
Woodard Weikart Emhardt & Naughton
ATTORNEYS

POSITIONAL ADJUSTMENT DEVICE FOR CASKET BEDS

BACKGROUND OF THE INVENTION

The bed accommodating a body within a casket must be adjustable as to height and, preferably, also as to attitude, particularly since open-casket display of the body requires a vertical position differing from that required at closing of the casket. Vertically mounted, threaded elevating screws are often utilized in the prior art to accomplish the required adjustability. In such structures the bed is supported by a bracket which is threaded on threaded elevating rods located at the head of the bed or at both the head and foot. Manual rotation of the threaded rod thus adjustably positions the bracket on the rod and changes the bed position. It is a highly desirable feature for such bed supporting mechanisms that they be adaptable to various casket heights and that they be capable of convenient installation and of being easily modified to give various effective lengths of the threaded rod serving as an elevating screw.

The position-adjusting mechanism of the present invention utilizes a bracket at the base of the threaded shaft which freely accommodates the shaft. An abutment member, taking the form of an apertured disc or washer, has an aperture diameter slightly greater than the sum of the thread minor diameter and the depth of the shaft thread, but less than the major diameter of the shaft thread, and this disc may be "wobbled" to the desired place along the shaft length to define the effective length of the shaft by limiting the depth the shaft extends into the base bracket.

DESCRIPTION OF THE PREFERRED EMBODIMENT

Figure 1:
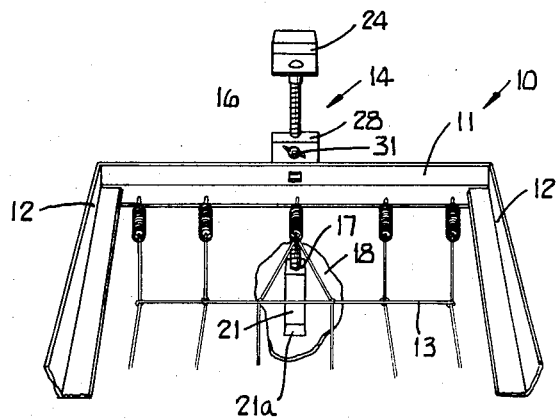
FIG. 1 is a fragmentary, perspective view of the apparatus of the present invention mounted on a casket bed.

Referring initially to FIG. 1, the bed frame 10 may seem to be composed of a transverse head member 11 and longitudinal side frame members 12 with spring construction 13 extending between the frame members in conventional fashion. The bed positioning mechanism of the present invention is indicated generally at 14.

Figure 2:
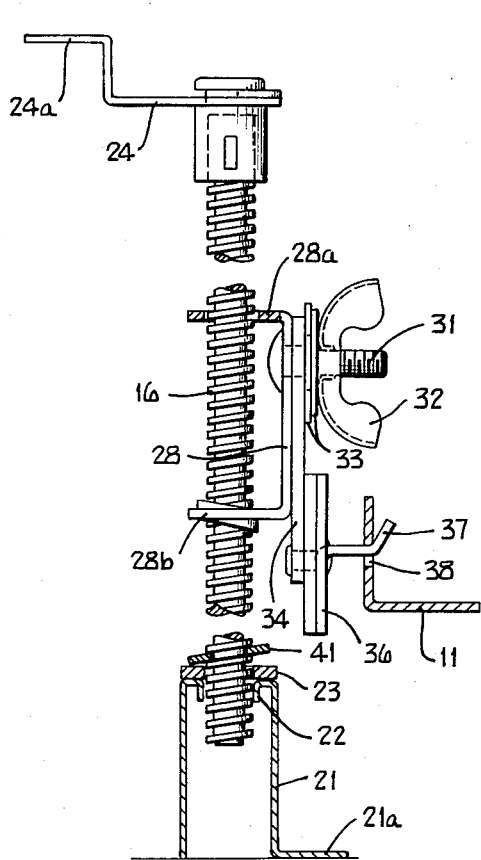
FIG. 2 is an enlarged, side view of the adjustment mechanism of the present invention with the lower bracket shown in section.
Figure 3:
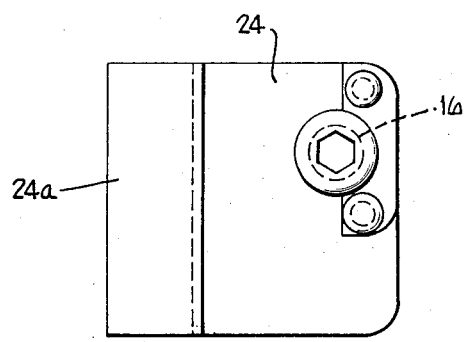
FIG. 3 is a top plan view of the apparatus shown in FIG. 2.

Referring to FIGS. 2 and 3, the bed positioning mechanism includes a vertical threaded rod or shaft 16 which functions as an elevating screw. The rod 16 is mounted within a casket adjacent the transverse frame member 11. The mounting is accommplished by means of a foot or base bracket 21 which is generally U-shaped in configuration and is provided with an aperture 22 which freely accommodates the threaded lower end of the shaft 16. Disposed on the upper face of the bracket 21 is a thrust plate 23 having a central aperture registering with the aperture 22 in the bracket which also freely receives the threaded lower end of the shaft. It will be understood that the bracket 21 may be attached to the casket base at the flange portion 21a. The upper end of the shaft is journaled by an upper mounting bracket 24 having a flange portion 24a which may be secured to the upper margin of the casket sidewall or to any other suitable portion of the casket. It will be understood that the bracket 24 permits free rotation of the shaft 16 and the upper end of the shaft, the portion extending above the bracket 24, is adapted to receive a crank member or other suitable means for manually rotating the shaft about its longitudinal axis.

As may best be seen in FIG. 2, a generally U-shaped bracket 28 has a flange portion 28a which is apertured to freely accommodate the threaded shaft 16 and has a lower flange portion 28b which is apertured so that it must be threaded onto the shaft, rotation of the shaft serving to move the bracket upwardly and downwardly on it depending upon the direction of rotation. The central portion of the bracket 28 has extending from it a threaded pin 31 which accommodates a bolt 32 and, by means of pads 33 serves to clamp to the bracket 28 a plate 34. The plate 34 has riveted to it a bracket 36 having outwardly extending tongues 37, the tongues extending through apertures 38 in the transverse bed frame member 11. The function of the plate 34 and the clamping screw 31 is to permit the attitude of the casket bed frame to be varied, this structure forming no part of the present invention. From an inspection of FIG. 2, it will be evident that axial rotation of the shaft 16 serves to position vertically the bracket 28 and the casket bed frame supported by it.

Figure 4:
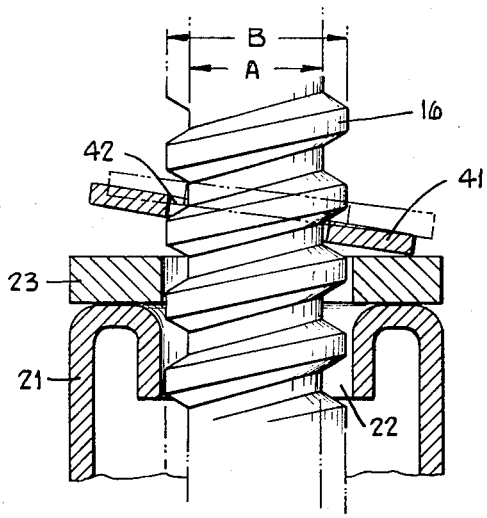
FIG. 4 is an enlarged, fragmentary view of the shaft and the abutment member.

The means for defining the effective length of the shaft 16, that is, its depth of insertion into the bracket 21, takes the form of a stop member 41. The stop member is a disc having an aperture 42 (FIG. 4) centrally through it and the diameter of the member 41 is such that it engages the plate 23 as shown in FIGS. 2 and 4. In FIG. 4, the minor diameter of the threads formed on the shaft 16 is indicated at A and the major diameter of the threads is indicated at B. The stop member 41 is shown in locked position on the shaft in which it is engaged with the plate 23 and, while the shaft is free to be rotated, the stop member 41 prevents the shaft from dropping through the registering apertures in the plate 23 and the bracket 21. The diameter of the aperture 42 in the stop member 41 is slightly greater than the sum of the minor diameter of the shaft threads and the depth of the thread, and is smaller than the major diameter of the threads. Thus, when it is necessary to move the stop member 41 on the shaft, it can be manually displaced sidewardly to its broken line position of FIG. 4. In this position the aperture will clear the threads on one side of the shaft, permitting the stop member to be tilted along the shaft over one thread, then moved sidewardly to the opposite extreme position in which the stop member aperture will clear the shaft thread on the other side and the stop member may then again be tilted and raised. The stop member may thus be "wobbled" or "walked" along the shaft to the desired position, orienting the shaft 16 with the bracket 21 as desired, and with the stop member 41 again centered substantially on the shaft, it will serve as a stop preventing the shaft from falling through the bracket 21. The effective lengths of the shaft may thus be easily and conveniently adapted to various size caskets and various casket mounting positions.

We claim:

1. A position-adjusting mechanism for a casket bed or the like comprising a bracket adapted to be attached to a bed frame, a threaded shaft extending through a thread accommodating aperture in said bracket whereby axial rotation of said shaft shifts the position of said bracket along the shaft, means for supporting said shaft vertically within a casket with its upper end accessible for manual rotation comprising a base support member adapted to be attached to a casket base and apertured to have freely inserted in it the lower end portion of said threaded shaft, an upper support member journaling the upper end of said shaft and adapted to be attached to a casket, and a stop member carried on said shaft and adapted to engage said base support member, said stop member having an aperture through which said shaft extends, said aperture having a diameter greater than the sum of the minor diameter of the shaft thread and the depth of the shaft thread but less than the major diameter of the shaft thread.

2. A position-adjusting mechanism as claimed in claim 1 in which said stop member takes the form of a flat washer with its outer diameter larger than that of the aperture in said base suppoer member.

3. A position adjusting mechanism as claimed in claim 2 in which said base support member takes the form of a bracket of inverted U-shaped configuration with its shaft accommodating aperture located in its central web.

* * * * *